(12) United States Patent
Tridon et al.

(10) Patent No.: US 7,718,098 B2
(45) Date of Patent: May 18, 2010

(54) METHOD FOR OBTAINING AN OPTICAL LENS AND JOINT AND DEVICE FOR THE IMPLEMENTATION THEREOF

(75) Inventors: Jean-Marc Tridon, Dijon (FR); Pascal Soave, Longecourt En Plaine (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 1105 days.

(21) Appl. No.: 10/506,883

(22) PCT Filed: Mar. 17, 2003

(86) PCT No.: PCT/FR03/00846

§ 371 (c)(1),
(2), (4) Date: Mar. 23, 2005

(87) PCT Pub. No.: WO03/078144

PCT Pub. Date: Sep. 25, 2003

(65) Prior Publication Data

US 2005/0179148 A1 Aug. 18, 2005

(30) Foreign Application Priority Data

Mar. 19, 2002 (FR) .................................. 02 03380

(51) Int. Cl.
*B29D 11/00* (2006.01)
(52) U.S. Cl. .......................... 264/2.2; 249/82; 249/105; 264/2.5; 425/447; 425/808
(58) Field of Classification Search ................. 264/1.1, 264/2.2, 2.5, 40.5; 425/808, 135, 447, 449; 249/82, 105
See application file for complete search history.

(56) References Cited

U.S. PATENT DOCUMENTS 2,964,501 A * 12/1960 Sarofeen ..................... 524/238

(Continued)

FOREIGN PATENT DOCUMENTS

EP 0 028 975 5/1981

(Continued)

OTHER PUBLICATIONS

Patent Abstracts of Japan, vol. 016, No. 565 (P-1457), Dec. 7, 1992 & JP 04 218016 A (Asahi Oputeikaru:KK), Aug. 7, 1992 Abrege.

(Continued)

*Primary Examiner*—Mathieu D. Vargot
(74) *Attorney, Agent, or Firm*—Young & Thompson

(57) ABSTRACT

The method includes the use of a closed mold consisting of two shells (2,3) and an annular joint (4), the joint having a hole (19) for filling the mold cavity with a polymerizable material, the introduction of the material occurring after a stage in which an external mechanical effort is exerted in order to bring the shells (2,3) together and before a stage in which the effort is relaxed. In the joint (4), the filling hole (19) includes two sections. A first section extends from the molding cavity to the second section which is wider. The device includes elements (34-40) for exerting an external effort in order to bring the shells (2,3) together and elements for introducing the polymerizable material into the molding cavity.

49 Claims, 4 Drawing Sheets

U.S. PATENT DOCUMENTS 3,070,846 A    1/1963    Schrier
3,136,000 A    6/1964    Slyk
4,251,474 A    2/1981    Blandin
4,257,988 A    3/1981    Matos et al.

FOREIGN PATENT DOCUMENTS

JP    55134224    9/1980
JP    04063210    5/1998
WO    WO 00 30836    6/2000

OTHER PUBLICATIONS

Patent Abstracts of Japan, vol. 1998, No. 03, Feb. 27, 1998 & JP 09 300478 A (Nikon Corp), Nov. 25, 1997 abrege.

* cited by examiner

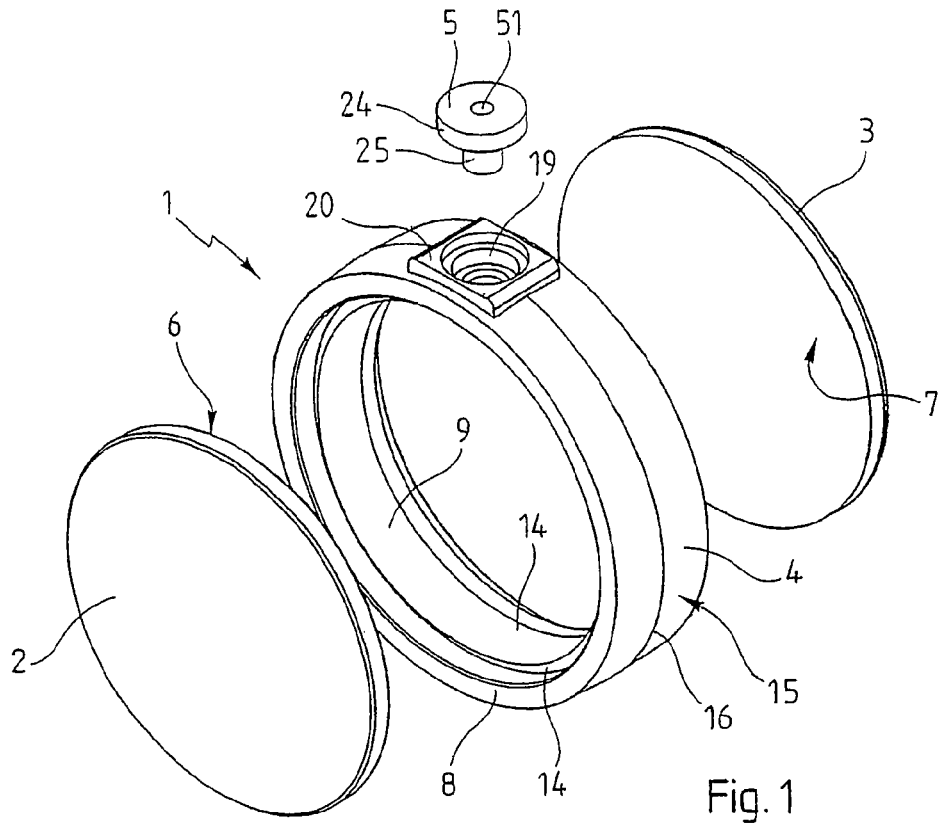
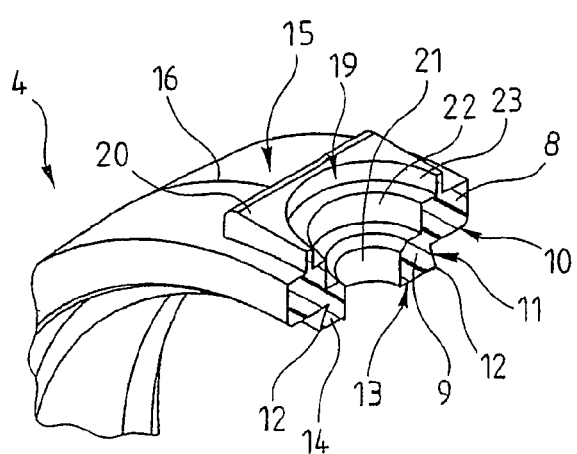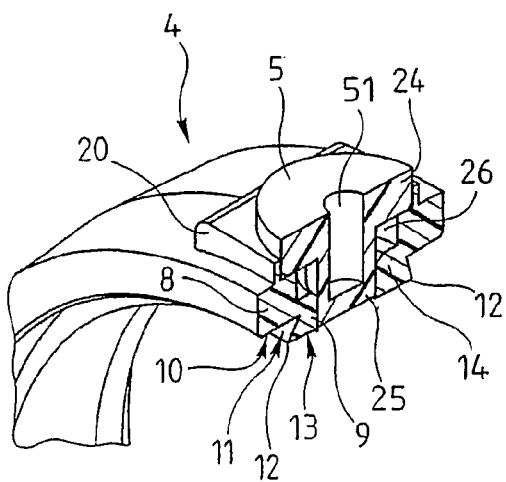

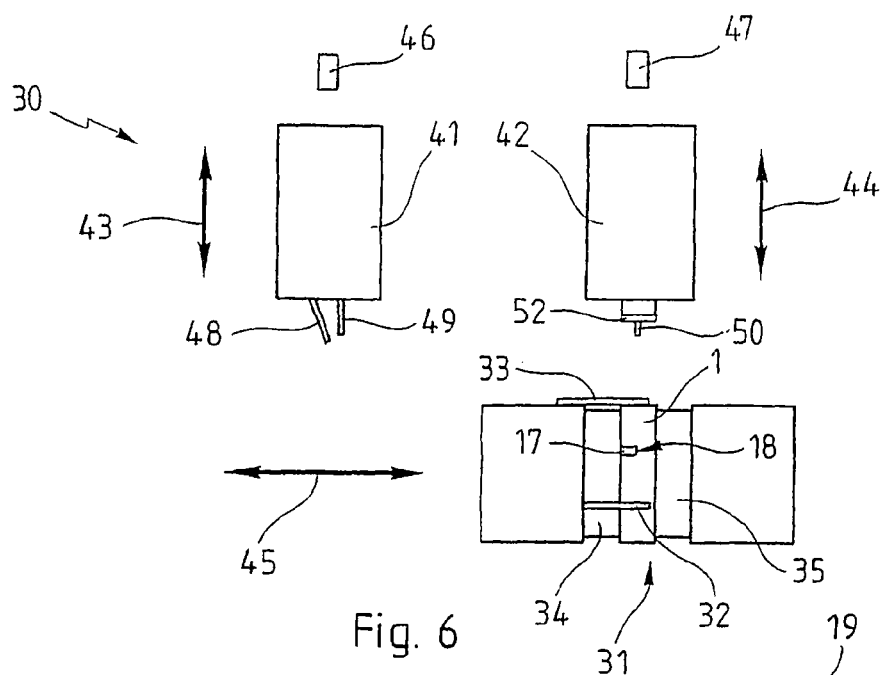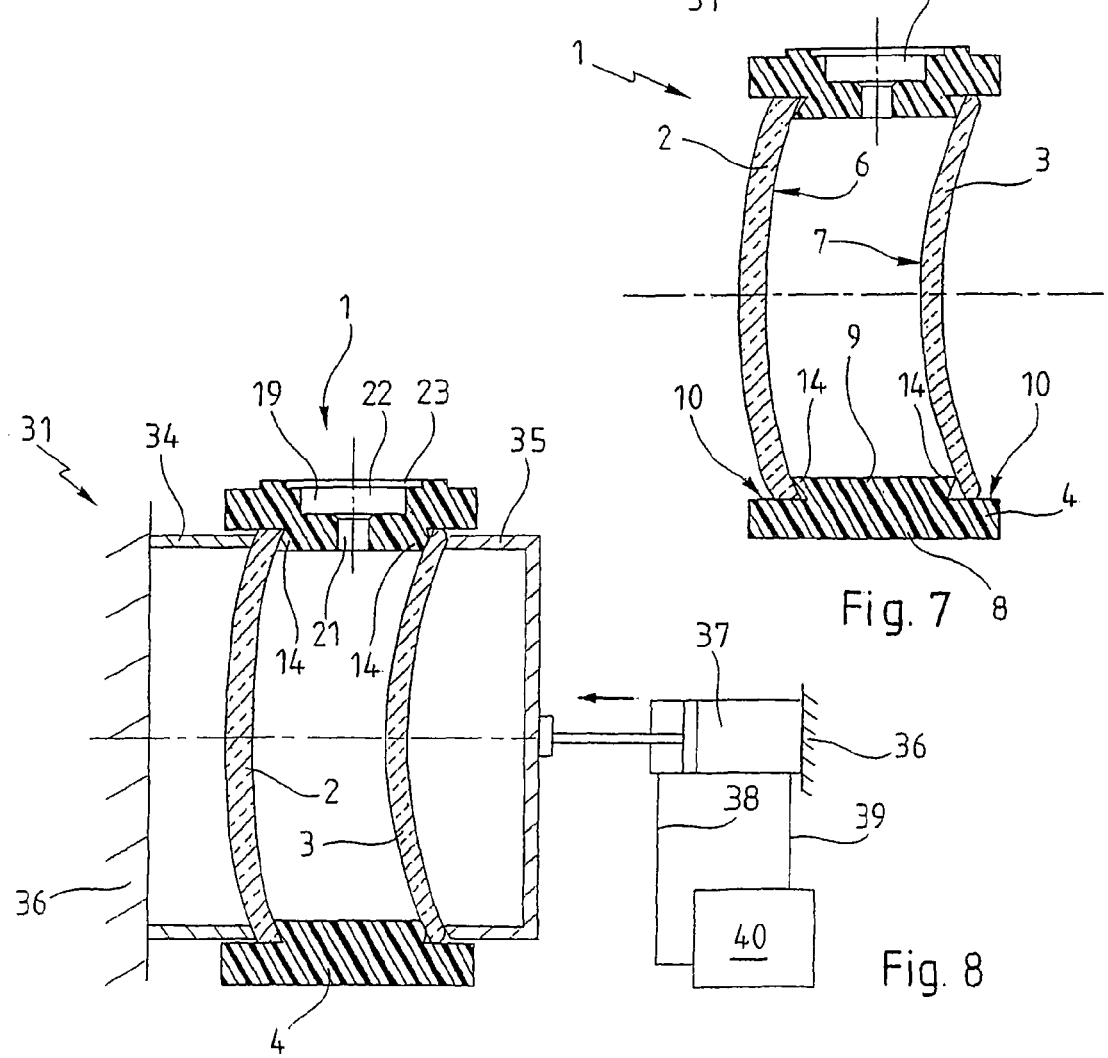
Fig. 6
Fig. 7
Fig. 8

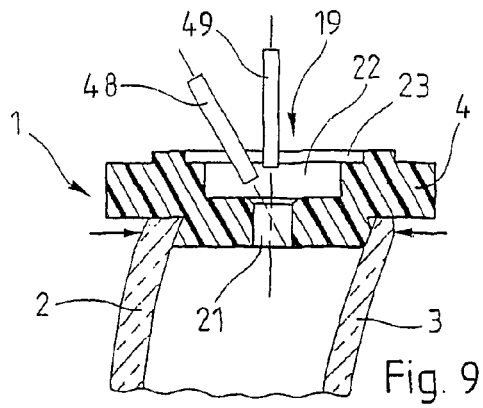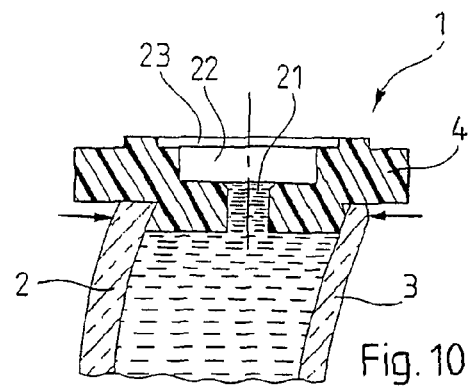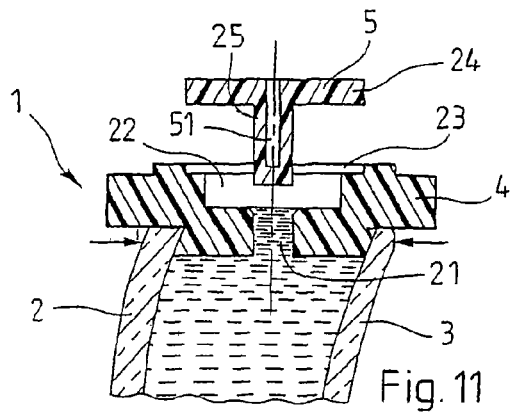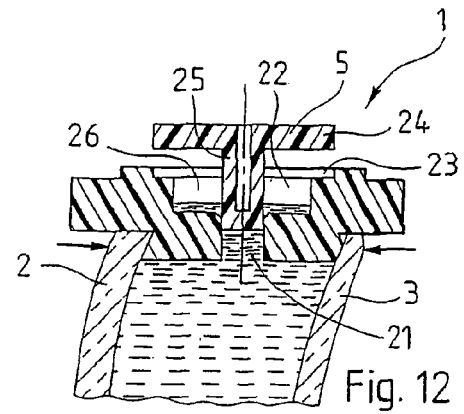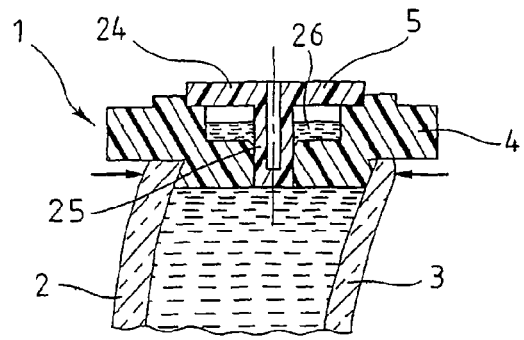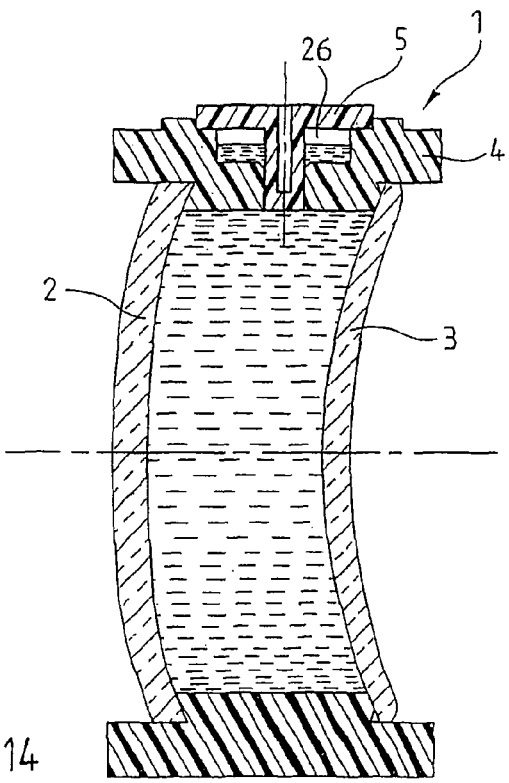

METHOD FOR OBTAINING AN OPTICAL LENS AND JOINT AND DEVICE FOR THE IMPLEMENTATION THEREOF

BACKGROUND OF THE INVENTION

1. Field of the Invention

The invention relates to obtaining an optical lens from a polymerizable material, in particular, although not exclusively, an ophthalmic lens.

2. Description of the Related Art

It is known that it is possible to obtain a lens of this kind with a mold formed of two shells disposed at a distance from and facing each other and an annular seal cooperating with the periphery of the shells to define a molding cavity. The faces of the shells facing toward the cavity are generally concave and convex, respectively, and have a shape corresponding to the anterior face and the posterior face, respectively, of the lens to be obtained, in order for the anterior and posterior faces to have the required shape upon removal from the mold or after machining to finish them.

Diverse methods of obtaining an optical lens with a mold of this kind are known already, and in particular a method in which the first step is to place the molding shells on the seal, a spring clamp for retaining the shells is then fitted, the cavity is then filled manually using an injection nozzle that is inserted between the seal and one of the shells thanks to deformation of the seal and slight movement of the shell in question against the action of the clamp, filling continuing until overflowing occurs, in order to expel excess air, and the filled mold held in the assembled state by the clamp is then transported to a water bath in which the material introduced into the mold is polymerized by heat.

To enable the mold to accompany shrinkage of the material that it contains during polymerization, the seal is adapted to be compressed axially by the effect of the movement of the shells toward each other caused by the shrinkage.

There have already been proposed, in particular in U.S. Pat. No. 3,136,000 and in international application WO 00/30836, molds of the kind mentioned above in which the seal has respectively one lateral hole and several lateral holes, the polymerizable material being introduced into the cavity of the mold by means of a nozzle fitted into the filling hole in the manner of a syringe, the air initially present in the molding cavity escaping respectively via a passage separate from the nozzle and via at least one vent hole separate from the filling hole. After introduction of the polymerizable material into the mold, the single hole and the multiple holes are respectively plugged by a flap that returns to a position in front of the single hole during the removal of the nozzle and by plugs that are pushed into the multiple holes from the outside.

There has also been proposed, in particular in U.S. Pat. No. 4,251,474, for situations in which there is no hole in the seal, to dispose the mold horizontally, to introduce the filling nozzle between the seal and the upper shell and then, once the mold has been filled and the nozzle removed, to move the upper shell downward by means of an external mechanical force while bracing the lower shell, so that the excess portion of the material introduced into the mold gets past the lip of the seal cooperating with the upper shell and overflows out of the mold. When the upper shell is released, the seal tends to return to its original configuration, but because air is not able to penetrate into the molding cavity, each molding shell is held in contact with the seal in the manner of a sucker, so that there is no need to use the spring clamp referred to above, which could anyway provide only a modest spring force compared to the forces that may be produced mechanically.

SUMMARY OF THE INVENTION

The invention aims to improve the conditions of use of molds of the kind referred to above.

To this end it proposes a method of obtaining an optical lens from a polymerizable material, which method uses a mold that is formed of two facing and spaced shells and an annular seal comprising means for cooperating with the periphery of said shells to define a molding cavity, said seal being adapted to be compressed elastically when said shells are moved toward each other, which method comprises a step of filling said molding cavity with said polymerizable material, a step of polymerizing the material filling the molding cavity, a step of applying an external mechanical force to move said shells toward each other, and a step of releasing said force, and which method is characterized in that a filling hole is provided in said annular seal, away from said means for cooperating with the periphery of the shells, in that during said filling stage said material is introduced into the cavity through said filling hole, and in that said material is introduced after said step of applying a mechanical external force to move said shells toward each other and before said step of releasing said force.

Applying the external mechanical force for moving the shells toward each other before filling the mold, rather than after filling the mold, combined with filling through a hole in the seal away from the means with which the latter is provided to cooperate with the periphery of the shells, enables the mold to be filled without any leakage from the molding cavity between the shells and the seal.

This absence of leaks is particularly advantageous, not only because of the saving in polymerizable material resulting from the absence of wastage as a result of overflow around the shells, but also, and more importantly, because, it avoids the operations following removal from the mold that were previously associated with the overflow of material at the location of the means for cooperating with the periphery of the shells, which in practice comprise a lip with a groove on the outside; this avoids the need to work on the lens after its removal from the mold to eliminate flash and facilitates cleaning the seal before recycling.

According to preferred features, a plug is provided for plugging each hole in said seal and said filling step comprises, after introducing said material and before said step of releasing said force, a step of plugging each of said holes with one of said plugs.

Accordingly, when the force is released, there is a suction effect at the level of each shell whereby the mold remains in the assembled configuration of its own accord.

Said filling hole is preferably the only hole in said annular seal.

The operation of filling the mold is therefore particularly simple and convenient, since after the operation of introducing the material through the filling hole, a single operation is sufficient to fit a plug.

Said filling step is preferably effected with said mold placed vertically with said filling hole situated at the top of said seal.

The operation of introducing the polymerizable material into the mold may therefore be effected under excellent conditions, in particular where the evacuation of the air initially contained in the mold is concerned: the outlet of the filling hole being situated at the top of the cavity, it is certain that the air initially contained in the mold has been entirely evacuated when the filling hole itself begins to fill.

According to other features preferred for reasons of simplicity and convenience of implementation:

a boss is provided around said filling hole and projects relative to the lateral surface of the seal; and/or said filling hole is oriented in a radial direction; and/or said filling hole is halfway or substantially halfway between said means adapted to cooperate with a first shell and with the second shell, respectively; and/or said step of applying a mechanical external force to move said shells toward each other is adapted to move said shells toward each other until a predetermined force is reached; and optionally said force to move said shells toward each other is produced by an actuator connected to a control center; and/or during said step of applying a force to move said shells toward each other, said force is applied to said shells by way of respective sleeves having a diameter slightly less than that of said shells.

According to other features preferred for reasons of simplicity and convenience of implementation:

a unit is provided for receiving said mold and said step of applying a force to move said shells toward each other and said step of releasing said force are effected by means of said receiving unit; and optionally centering means and angular positioning means are provided in said unit for receiving the mold; and optionally said centering means comprise two fingers oriented longitudinally and adapted to cooperate with the lateral surface of said seal and said angular positioning means comprise a fork adapted to cooperate with a boss projecting relative to the lateral surface of said seal; and/or for effecting said filling step, there are provided a station for introducing said polymerizable material into the cavity of said mold and a station for plugging said filling hole, said introduction station and said plugging station being disposed side by side, and in that said unit for receiving the mold is movable between a first position in which it is vertically aligned with the plugging station and a second position in which it is vertically aligned with the introduction station.

According to other features preferred for the same reasons:

said step of introducing the polymerizable material is effected by means of a station that comprises a nozzle for introducing said material and a nozzle for aspirating surplus material; and optionally said nozzle for introducing said material is inclined; and/or the distal end of said nozzle for introducing said material is below the distal end of said aspiration nozzle.

According to other features preferred for the same reasons:

a plug is provided for plugging said filling hole and comprises a blind hole and a step of plugging said filling hole with said plug is effected at a plugging station comprising a canula adapted to be engaged in said blind hole of said plug; and optionally said canula is connected to a vacuum system to hold said plug in place on said canula and said canula is vented to the atmosphere to release said plug; and/or said plug is pressed into said filling hole by driving said plugging station.

According to other features preferred for the same reasons:

there is provided a relatively narrow lug projecting relative to the lateral surface of said seal and having a transverse end surface incorporating a predetermined location relative to the remainder of the seal; and optionally for effecting said filling step, there are provided a station for introducing said polymerizable material into the cavity of said mold and a station for plugging said filling hole, said introduction station and said plugging station being disposed side by side, a unit is provided for receiving said mold in a predetermined position and said receiving unit is mobile between a first position in which it is vertically aligned with the plugging station and a second position in which it is vertically aligned with the introduction station; and optionally at least one optical cell is provided for detecting the position of the mold relative to said filling station or said plugging station and said unit for receiving the mold is placed in vertical alignment with said filling station or in vertical alignment with said plugging station in conjunction with said optical cell; and optionally respective optical cells are provided for said filling station and said plugging station.

A second aspect of the invention provides the annular seal as explained hereinabove and a third aspect of the invention provides a device comprising means for implementing the method explained above.

It will be noted that the seal referred to above may be used under conditions other than those explained above and in particular to mold materials that are not subject to any shrinkage, in which case the capacity for axial deformation of the seal is not indispensable.

It will also be noted that it is beneficial for the material of the plug to be the same as the material of the rest of the seal, in particular for reasons connected with recycling, regardless of the material, and/or with the operating conditions, and that the same remark applies to detecting the position of the mold by means of the relatively narrow lug projecting from the external surface of the mold and at least one optical cell.

BRIEF DESCRIPTION OF THE DRAWING FIGURES

The explanation of the invention continues next with the description of one embodiment of the invention given hereinafter by way of nonlimiting example and with reference to the appended drawings. In the drawings:

FIG. 1 is an exploded perspective view of a mold for obtaining an optical lens in accordance with the invention;

FIG. 2 is a partial sectional view in perspective of the seal of the mold, without its plug, the section plane containing the axis of the seal and the axis of the filling hole;

FIG. 3 is a view similar to FIG. 2 but with the plug fitted into the filler hole;

FIG. 6 is a diagrammatic elevation view of a device for obtaining an optical lens using the mold shown in FIGS. 1 to 5;

FIG. 7 is a diagrammatic elevation view in section taken along the same line as in FIGS. 2 and 3 of the mold in the assembled configuration without the plug of the seal;

FIG. 8 is a similar view of the mold in place in the receiving unit (the support fingers and the fork are not shown), this unit exerting on the mold an external mechanical force for moving the shells toward each other;

FIGS. 9 to 13 are similar partial views of the mold showing successive steps of the filling operation; and FIG. 14 is a similar view of the filled mold which is self-supporting by virtue of the suction effect when it is extracted from the receiving unit of the device shown in FIG. 6.

DETAILED DESCRIPTION OF THE PREFERRED EMBODIMENT

Figure 4:
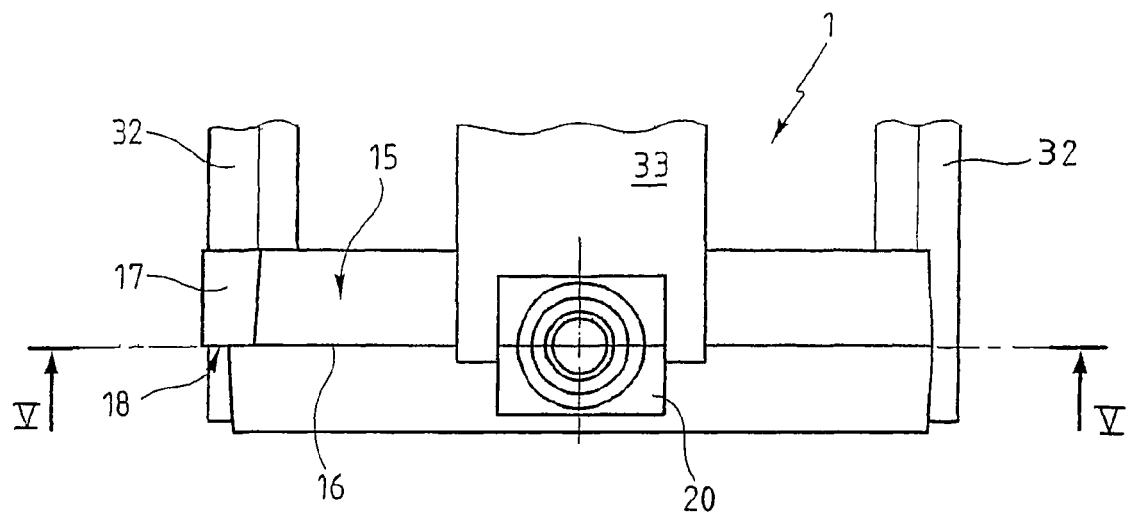
FIG. 4 is a plan view of the mold, without the plug, in position on the support fingers and the angular positioning fork of the receiving unit of the mold provided in the device shown diagrammatically in FIG. 6.

The mold 1 of which an exploded perspective view is shown in FIG. 1 comprises two shells 2 and 3 and an annular seal 4 provided with a removable plug 5.

The shells 2 and 3 are conventionally made from relatively thick glass with one concave face, one convex face and a circular contour edge. The active face 6 of the shell 2, situated on the side facing the seal 4, is concave and has a conformation corresponding to the anterior face of the lens to be obtained. The active face 7 of the shell 3, also situated on the side facing the seal 4, is convex and corresponds to the posterior face of the lens to be obtained.

The seal 4 is molded from a synthetic elastomer material. It has a globally annular conformation with an external belt 8 to the inside of which is attached a bead 9 that is narrower than the belt 8 and has a dovetail-shaped cross section whose narrower side is that by which the bead is attached to the belt 8.

Thus there exists on either side of the bead 9 a recess adapted to receive one of the shells 2 and 3, the peripheral surface of this recess being the internal surface 10 of the belt 8, whose diameter corresponds to that of the shells 2 and 3, while the shoulder surface of the recess is the flank surface 11 of the bead 9, which is inclined outward and toward the center of the seal. Each edge 12 at the junction between a surface 11 and the inside peripheral surface 13 of the bead 9 thus forms the edge of a lip 14 adapted to cooperate sealing fashion with one of the shells 2 and 3, as seen in FIGS. 7 and 8.

The external surface 15 of the seal 4 has a slight relief on either side of a central edge 16 that corresponds to the plane of the seal of the mold used to fabricate the seal 4.

Figure 5:
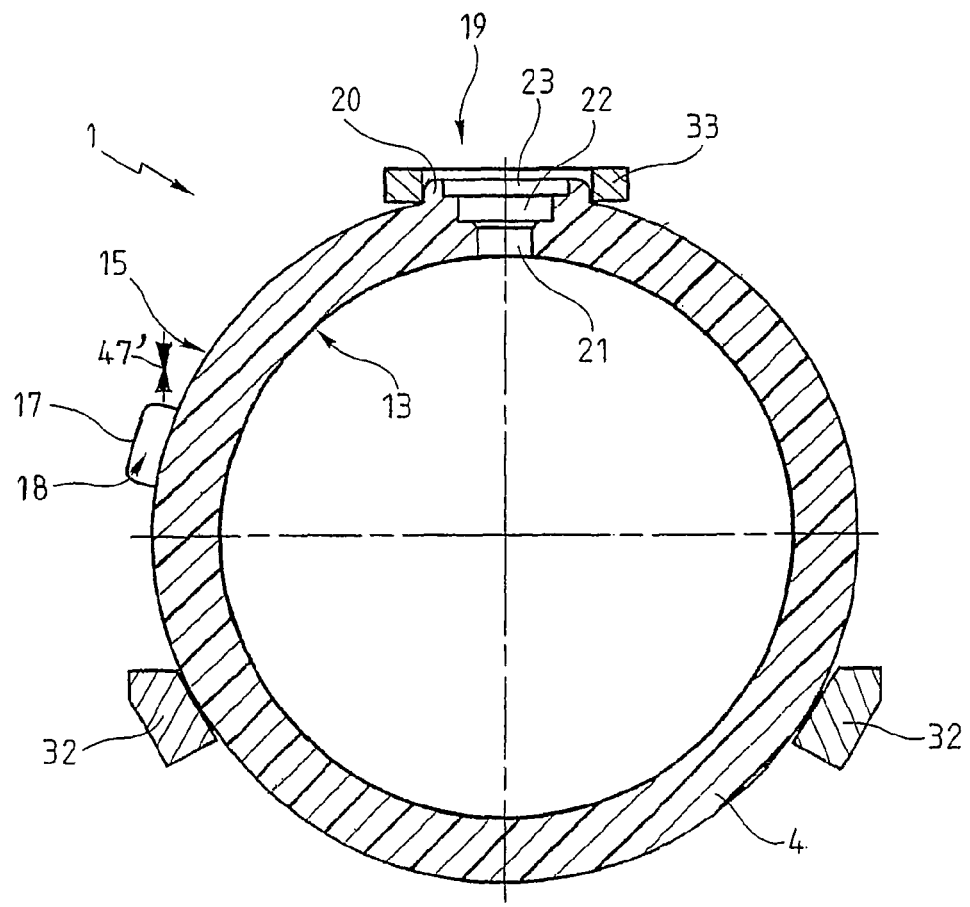
FIG. 5 is an elevation view in section taken along the line V-V in FIG. 4.

As seen in FIGS. 4 to 6, there projects from the lateral surface 15 a relatively narrow lug 17 that extends to only one side of the edge 16, the lug 17 having a transverse end surface 18 in the same plane as the edge 16.

The angular offset between the lug 17 and the hole 19 that is plugged by the plug 5 is such that, when the hole 19 is at the top of the seal 4, as shown in the drawings, the lug 17 is visible above the seal 14.

This is used to position the mold 1 and thus the hole 19 in the axial direction, as explained later.

The hole 19 is oriented in a radial direction and is centered in the plane that contains the edge 16, half way or substantially half way between the two opposite recesses each delimited by the surfaces 10 and 11 of the seal 4 that cooperate with the shells 2 and 3.

Around the hole 19 the seal 4 has a boss 20 projecting relative to the surface 15.

Between its two outlets, onto the external surface of the boss 20 and onto the internal surface 13 of the bead 9, respectively, the hole 19 has three sections 21, 22 and 23 with different diameters.

The section 21, which is the narrowest, extends between a first end, at the surface 13, and a second end at which it is joined to a first end of the section 22, which has a larger diameter than the section 21; a slight chamfer is formed at the junction between the sections 21 and 22, the latter extending as far as a second end at which it is joined to the section 23, which has a greater diameter, the section 23 extending as far as the upper surface of the boss 20.

Thus the sections 21, 22 and 23 of the hole 19 have a generally stepped arrangement.

The plug 5 is made from the same material as the seal 4. It has a head 24 and a body 25. The diameter of the head 24 corresponds to the diameter of the section 23, the diameter of the body 25 corresponds to the diameter of the section 21, and the length of the body 25 corresponds to the sum of the lengths of the section 21 and the section 22. Accordingly, when the plug 5 is fitted into the hole 19, as shown in FIG. 3 in particular, the free end of the body 25 is flush with the surface 13 and the transverse surface of the head 24 flanking the body 25 bears on the shoulder surface of the section 23.

The fit between the section 21 and the body 25 is moderately tight so that when the body 25 is in place in the section 21 the latter is plugged and sealed. Similarly, the fit between the head 24 and the section 23 is moderately tight, so that fitting of the head 24 into the section 23 plugs and seals the latter.

In the example shown, the diameter of the section 21 is of the order of 7.8 mm, that of the section 22 is of the order of 16.6 mm, and that of the section 23 is of the order of 17.8 mm, the length of the section 21 is of the order of 3 mm, that of the section 22 is of the order 3.7 mm, and that of the section 23 is of the order of 2.4 mm.

It will be noted when the plug 5 is in place in the hole 19, there exists within the section 22, around the body 25, a sealed chamber 26 plugged on one side by the cooperation between the body 25 and the section 21 and on the other side by the cooperation between the head 24 and the section 23.

Given the dimensions specified above, it should also be noted that the volume of the chamber 26 is greater than the volume of the section 21.

As shown in FIGS. 10 to 13, which, like FIGS. 6 to 9, are highly diagrammatic, unlike FIGS. 1 to 5, the result of this is that if the molding cavity delimited by the shells 2 and 3 fitted into the seal 4 is filled until the polymerizable material reaches the junction between the sections 21 and 22 and the plug 5 is then fitted, the material contained in the section 21 may be accommodated in the chamber 26 and retained therein in a sealed manner when the plug 5 has been pushed all the way in, which prevents overflow of polymerizable material out of the mold.

To obtain an optical lens using the mold 1, the shells 2 and 3 are fitted into the seal 4, as shown in FIG. 7 in particular, after which the mold 1 obtained in this way is placed in the filling device 30 shown in FIG. 6, to be more precise in a receiving unit 31 of the mold of the device.

To receive the mold 1, the unit 31 comprises two fingers 32 and a fork 33, all of which are oriented longitudinally.

As seen in FIGS. 4 and 5 in particular, the mold 1 is disposed vertically in the unit 31 with the filling hole at the top of the seal 4, the fingers 32 and the fork 33 being at angular positions substantially corresponding to 4 o'clock, 8 o'clock and 12 o'clock on a clock face. The seal 4 simply rests on the fingers 32, which center the seal 4 with respect to the unit 31, while the boss 20 is engaged in the fork 33, which positions the seal 4 angularly relative to the unit 31 and in particular ensures that the hole 19 is at the top of the seal 4.

On each side of the location for the mold 1 the unit 31 comprises a respective sleeve 34 and 35, seen in more detail in FIG. 8 (in which the fingers 32 and the fork 33 are not shown).

The sleeve 34 is fixed directly to the frame 36 of the unit 31 whereas a hydraulic actuator 37 is provided between the sleeve 35 and the frame 36 whose body is fixed to the frame 36 and whose piston rod is fixed to the sleeve 35. The chambers of the actuator 37 are connected by respective pipes 38 and 39 to a control center 40 which conventionally comprises a hydraulic pump and distribution and regulation means.

The unit 31 has a configuration for fitting and removing the mold 1 in which the piston rod 37 is retracted, i.e. a position in which the sleeve 35 is offset to the right relative to the position shown in FIG. 8.

With the unit 31 in this configuration the mold 1 is put into position by sliding it along the fingers 32 until the shell 2 comes into contact with the sleeve 34 and engaging the boss 20 in the fork 33.

At the control center 40, the operator then starts the automatic control means provided therein to deploy the piston rod 37 until the pressure in the pressurized chamber of the actuator, in this example the chamber on the right as seen in FIG. 8, reaches a predetermined pressure threshold, the control means provided in the control center 40 then holding the piston rod 37 in this position.

During the deployment of the piston rod 37, the sleeve 35 comes into contact with the shell 3, after which further movement of the piston rod applies a force moving the shells 2 and 3 toward each other, the effect of which is that the seal 4 is compressed elastically in the axial direction, in particular at the location of the lips 14, as may be seen by comparing FIGS. 7 and 8.

This compression of the seal 4 by an external mechanical force provides an excellent seal between the seal 4 and the shells 2 and 3.

In the example shown, the synthetic elastomer from which the seal 4 is made has, as measured by the test method NF T 46-002, a modulus of elasticity at 100% of the order of 0.8 to 1.3 MPa, a yield strength of the order of 3 to 7 MPa, and an elongation at the yield point of the order of 500 to 750%; its SHORE A (30 s) hardness, using the NF ISO 868 test method, is of the order of 30 to 49; the diameter of the actuator 37 is 40 mm and the predetermined pressure threshold at which the control means in the control center 40 deploy the piston rod 37 is of the order of 0.3 MPa.

The external mechanical force applied by the actuator 37 to the mold 1 via the sleeves 34 and 35 is therefore relatively high, of the order of 37.7 daN.

It will be noted that the contact surface between the sleeve 34 and the shell 2 is opposite the contact surface between the annular lip 14 and the shell 2 and likewise the contact surface between the sleeve 35 and the shell 3 is opposite the contact surface between the annular lip 14 and the shell 3, which minimizes the risk of deformation of the shells 2 and 3.

The structure and operation of the device 30 are described in more detail next.

The device 30 comprises, in addition to the unit 31, a station 41 for introducing polymerizable liquid material and a plugging station 42.

Each of the stations 41 and 42 is mobile in the vertical direction and adapted to be driven upward and downward, as shown by the double-headed arrows 43 and 44, whereas the receiving unit 31 is mobile in the horizontal direction and is adapted to be driven toward the right and toward the left, as shown by the double-headed arrow 45.

At each of the stations 41 and 42 there is a respective optical cell 46 and 47 for detecting the position of the mold 1 in the axial direction, each of the cells 46 and 47 comprising an emitter and a receiver of light beams such as the incident beam and reflected beams 47' shown in part in FIG. 5. The incident beam 47' is oriented vertically and when the mold 1 is under the cell emitting the beam, the latter is at the level of the surface 15, and always at a distance from the latter less than the thickness of the lug 17. When the mold is in a position such that the lug 17 is vertically in line with the incident beam 47', the beam is reflected by the lug 17 and the cell that emitted the beam receives and detects a reflected beam. On the other hand, when the mold 1 is in a position in which the lug 17 is not vertically aligned with the incident beam 47', no reflection of the beam occurs at the lug 17, and there is therefore no reflected beam.

It is therefore possible, based on the information as to whether the respective cells 46 and 47 receive a reflected beam or not, to position the mold 1 very accurately with the surface 18 of the lug 17 that is aligned with the emitted beam, i.e. the surface 18 situated in the plane in which the hole 19 is centered, in a position in which the hole is centered with respect to the polymerizable liquid material introduction station 41 and the plugging station 42, respectively.

The polymerizable liquid material introduction station 41 comprises two nozzles projecting downward, respectively a nozzle 48 for introducing the polymerizable material into the cavity of the mold 1 and a nozzle 49 for aspirating surplus material in the hole 19. The nozzle 49 is in the transverse plane containing the beam emitted by the cell 46 and is centered with respect to the unit 31.

The plugging station 42 comprises a canula 50 for receiving the plug 5 projecting downward, situated in the transverse plane that contains the beam emitted by the cell 47 and centered with respect to the unit 31.

To cooperate with the canula 50, the plug 5 comprises a blind hole 51 that is open at the end adjoining the head 24 and closed at the end adjoining the body 25, the hole 51 having a diameter corresponding to the external diameter of the canula 50, which is connected to a vacuum system and surrounded, at the end opposite its free end, by an abutment 52 forming a shoulder around the canula 50.

When the unit 31 is in its configuration for fitting and removing the mold 1 its axial position is such that the mold is vertically aligned with the plugging station 42, as shown in FIG. 6.

The operator places the mold 1 by hand onto the fingers 32 and the fork 33, in the manner previously explained, and, for example using his other hand, threads the plug onto the canula 50, the latter penetrating into the blind hole 51 until the face of the head 24 opposite the body 25 comes up against the abutment 52, the plug being retained by aspiration by virtue of the fact that the canula 50 is at this time connected to a vacuum system.

As previously explained, using the control center 40, the operator commands the deployment of the piston rod 37 until an external force of predetermined intensity is exerted that moves the shells 2 and 3 toward each other.

The unit 31 is then driven toward the polymerizable liquid material introduction station 41, i.e. toward the left in FIG. 6, the drive means being controlled in conjunction with the cell 46 so that the mold 1 is positioned with the nozzle 49 centered relative to the hole 19, in the manner explained above.

The polymerizable liquid material introduction station 41 is then driven downward until the distal ends of the nozzles 48 and 49 are inside the hole 19, as shown in FIG. 9.

In the example shown, the distal end of the polymerizable material introduction nozzle 48 and the distal end of the surplus material aspiration nozzle 49 are in the section 22 of the hole 19 and in any event above and facing the section 21, the distal end of the nozzle 49 being above that of the nozzle 48.

Although the nozzle 49 is vertical, the nozzle 48 is slightly inclined so that the jet of polymerizable material that this nozzle emits is oriented obliquely to the section 21, the jet in question passing across this section and then encountering the shell 3, along which the polymerizable material flows as the cavity of the mold 1 is filled.

It will be noted that, in practice, to enable the jet of material to cross the section 21 in the manner just indicated the nozzle 48 is less inclined than in the highly diagrammatic FIG. 9.

The fact that the material introduced into the molding cavity runs along the wall of the shell 3 helps to produce a homogeneous lens and in particular avoids the formation of bubbles.

Introduction of the polymerizable material continues until the section 21 and a portion of the section 22 are filled with polymerizable material.

Given that the section 21 is at the top of the molding cavity, when this section is itself filled with polymerizable material it is certain that no air remains in the molding cavity.

The nozzle 49 then aspirates the overflowing polymerizable material. Its distal end is positioned relative to the top of the section 21 so that when aspiration ceases the level of polymerizable material is level with the top of the section 21, as shown in FIG. 10. The height difference between the distal end of the nozzle 49 and the top of the section 21 corresponds to the height of the column of polymerizable liquid material that remains between the time at which the polymerizable material level falls below that of the distal end of the nozzle 49 and the time at which aspiration stops.

It will be noted that the surface of the polymerizable liquid material is shown perfectly horizontal in the diagrams of FIGS. 10 and 11, whereas in practice this surface is domed.

Once introduction of the polymerizable material has finished, i.e. when aspiration of the material by the nozzle 49 ceases, the station 41 is driven upward to return to its position as shown in FIG. 6, after which the receiving unit 31 of the mold 1 is driven horizontally toward the plugging station 42 until the hole 19 is positioned by the cell 47 and the lug 17, in the manner previously explained, in a position in which the canula 50, fitted with the plug 5, is centered relative to the hole 19.

The station 42 is then driven downward, so that the plug 5 progressively penetrates into the hole 19, as shown in FIGS. 11 to 13.

When the body 25 of the plug penetrates into the section 21, the polymerizable liquid material that was contained in this section progressively passes into the chamber 26 in which, as explained above, it is trapped in a sealed manner because of the plugging of the section 21 by the body 25 of the plug and the plugging of the section 23 by the head 24.

It will be noted that expelling the polymerizable liquid material that was contained in the section 21 toward the chamber 26, i.e. away from the molding cavity, makes certain that no air is introduced into the molding cavity on the occasion of fitting the plug.

While the body 25 is being pressed into the section 21, the small section of the polymerizable liquid material between the body 25 and the perimeter of the section 21 causes a certain pressure rise in the molding cavity, but this dynamic pressure rise does not cause any leaks between the seal 4 and the shells 2 and 3 because of the external force applied by the sleeves 34 and 35, which external force has been maintained throughout the filling step, as shown by arrows in FIGS. 9 to 13.

Once the fitting of the plug 5 into the hole 19 has finished, i.e. once the station 42 is at the end of its downward travel, the connection between the canula 50 and the vacuum system is broken and the canula 50 is vented to the atmosphere, or even subjected to a slightly increased pressure, which releases the plug 5 from the station 42, which is then returned to its uppermost position shown in FIG. 6.

Using the control center 40, the operator then causes the hydraulic fluid to flow in the pipes 38 and 39 in the direction that retracts the piston rod 37 into the body of the actuator, to retract the sleeve 35, i.e. to move it toward the right in FIG. 8.

The releasing of the external force moving the shells 2 and 3 toward each other that occurs at the start of the retraction of the sleeve 35 has no effect on the positions of the shells 2 and 3 relative to the seal 4, each of the shells 2 and 3 being held in place by a suction effect.

The mold 1, filled with polymerizable material, therefore remains in the assembled configuration of its own accord, as shown in FIG. 14. The operator then removes the filled mold 1 from the unit 31, or more generally from the device 30, and it is then transported to a water bath in which it remains for the time required to polymerize the material in the molding cavity.

Once polymerization has been completed, the lens is removed from the mold by removing the seal 4 and then the shells 2 and 3.

It will be noted that the lack of leaks between the shells 2 and 3 and the lips 14 means that there is no polymerized material between the surfaces 10 and 11 of the seal 4 and no intervention is required on the lens after removal from the mold to eliminate flash, and this also facilitates cleaning the seal to eliminate polymerized material before recycling.

In fact, the only portion of the seal 4 in which polymerized material remains is the chamber 26, which is a very localized area that is relatively easy to deal with.

In a variant, not shown, only the cell 46 is provided: the position of the mold 1 in vertical alignment with the station 42 before the plugging operation is obtained by moving the unit 31 from the position in which the mold 1 is vertically aligned with the station 41 by the exact distance between the stations 41 and 42, using a stepper motor.

In this variant, the mold 1 is placed on the unit 31 in a position between the positions in which the unit 31 is respectively vertically aligned with the station 41 and vertically aligned with the station 42: this provides the operator with more space for threading the plug 5 onto the canula 50.

In the example shown, the cells 46 and 47 are above the station 41 and the station 42, respectively, but they may be located at any other location from where the lug 17 is visible.

In other variants, not shown, the filling hole comprises only the sections 21 and 22, the head of the plug bearing directly on the outside lateral surface of the seal; there is no hole in the seal away from the means for cooperating with the molding shells, such as the shoulder delimited by the surfaces 10 and 11, the double-acting hydraulic actuator 37 is replaced by some other type of actuator, for example a single-acting pneumatic actuator, and/or, more generally, a type of mechanism other than that shown in FIG. 8 is provided for producing an external mechanical force for moving the shells toward each other, this mechanism possibly being hand operated, like a vice or a chuck.

Numerous variants are also possible in respect of the dimensions and the mechanical characteristics of the components shown.

More generally, it is pointed out that the invention is not limited to the examples described and shown.

The invention claimed is:

1. A method of obtaining an optical lens from a polymerizable material, comprising:
   providing a mold (1) that is formed of two facing and spaced shells (2, 3) and an annular seal (4) comprising means (10, 11) for cooperating with the periphery of said shells (2, 3) to define a molding cavity, said seal (4) being adapted to be compressed elastically when said shells (2, 3) are moved toward each other;
   filling said molding cavity with said polymerizable material;
   polymerizing the material filling the molding cavity;

prior to the polymerizing the material filling the molding cavity, applying an external mechanical force to move said shells toward each other; and prior to the polymerizing, releasing said force, the force producing a compression of the seal (4) and the shells (2, 3), wherein a filling hole (19) is provided in said annular seal (4), away from said means (10, 11) for cooperating with the periphery of the shells (2, 3), in that during said filling stage said material is introduced into the cavity through said filling hole (19), and in that said material is introduced after said step of applying a mechanical external force to move said shells toward each other and before said step of releasing said force, wherein a plug (5) is provided for plugging said filling hole (19) in said seal (4) and said filling step comprises, after introducing said material and before said step of releasing said force, a step of plugging said filling hole (19) with said plug (5), the only hole in said annular seal (4) is said filling hole (19), and said filling hole comprises a first section (21) and a second section (22), the first section (21) extending between a first end opening into said molding cavity and a second end at which it is joined to a first end of said second section (22), in that said plug (5) is provided for plugging said filling hole and comprises a body (25) having a first portion adapted to fit tightly into said first section (21) of the filling hole (19) to plug the filling hole (19), and the body (25) of the plug (5) has a second portion to define with said second section (22) of the filling hole (19) a chamber (26) around said second portion of the body (25), with said first portion of the body (25) having a free end, and in that said cavity and said first section (21) of the hole (19) are filled during said step of introducing the polymerizable material into the cavity.

2. The method according to claim 1, wherein said molding cavity and said first section (21) of the filling hole (19) are filled during said filling step to the level of the junction between the first section (21) and the second section (22).

3. The method according to claim 2, wherein the volume of said chamber (26) around the body (25) of the plug (5) is greater than the volume of said first section (21) of the filling hole (19).

4. The method according to claim 1, wherein said filling hole (19) further comprises a third section (23) that extends between a first end at which it is joined to the second end of the second section (22) and a second end that opens to the exterior of said seal (4), and in that said plug (5) comprises a head (24) adapted to fit tightly into said third section (23) of the filling hole (19) to plug it, so that said chamber (26) is then entirely closed.

5. The method according to claim 1, wherein a boss (20) is provided around said filling hole (19) and projects relative to the lateral surface (15) of the seal (4).

6. The method according to claim 1, wherein said filling hole (19) is oriented in a radial direction.

7. The method according to claim 1, wherein said filling hole (19) is halfway or substantially halfway between said means (10, 11) adapted to cooperate with a first shell (2) and with the second shell (3), respectively.

8. The method according to claim 1, wherein said step of applying a mechanical external force to move said shells toward each other is adapted to move said shells toward each other until a predetermined force is reached.

9. The method according to claim 8, wherein said force to move said shells toward each other is produced by an actuator (37) connected to a control center (40).

10. The method according to claim 8, wherein, during said step of applying a force to move said shells toward each other, said force is applied to said shells by way of respective sleeves (34, 35) having a diameter slightly less than that of said shells (2, 3).

11. The method according to claim 1, wherein a unit (31) is provided for receiving said mold (1) and in that said step of applying a force to move said shells toward each other and said step of releasing said force are effected by means of said receiving unit (31).

12. The method according to claim 11, wherein centering means (32) and angular positioning means (33) are provided in said unit (31) for receiving the mold (1).

13. The method according to claim 12, wherein said centering means comprise two fingers (32) oriented longitudinally and adapted to cooperate with the lateral surface (15) of said seal (4) and said angular positioning means comprise a fork (33) adapted to cooperate with a boss (20) projecting relative to the lateral surface (15) of said seal.

14. The method according to claim 11, wherein, for effecting said filling step, there are provided a station (41) for introducing said polymerizable material into the cavity of said mold (1) and a station (42) for plugging said filling hole, said introduction station (41) and said plugging station (42) being disposed side by side, and in that said unit (31) for receiving the mold (1) is movable between a first position in which it is vertically aligned with the plugging station (42) and a second position in which it is vertically aligned with the introduction station (41).

15. The method according to claim 1, wherein said step of introducing the polymerizable material is effected by means of a station (41) that comprises a nozzle (48) for introducing said material and a nozzle (49) for aspirating surplus material.

16. The method according to claim 15, wherein said nozzle (48) for introducing said material is inclined.

17. The method according to claim 15, wherein the distal end of said nozzle (48) for introducing said material is below the distal end of said aspiration nozzle (49).

18. The method according to claim 1, wherein the plug (5) is provided for plugging said filling hole (19) and comprises a blind hole (51) and in that a step of plugging said filling hole with said plug is effected at a plugging station (42) comprising a canula (50) adapted to be engaged in said blind hole (51) of said plug (5).

19. The method according to claim 18, wherein said canula (50) is connected to a vacuum system to hold said plug in place on said canula and said canula (50) is vented to the atmosphere to release said plug (5).

20. The method according to claim 18, wherein said plug (5) is pressed into said filling hole (19) by driving said plugging station (42).

21. The method according to claim 1, wherein there is provided a relatively narrow lug (17) projecting relative to the lateral surface (15) of said seal (4) and having a transverse end surface (18) incorporating a predetermined location relative to the remainder of the seal.

22. The method according to claim 21, wherein, for effecting said filling step, there are provided a station (41) for introducing said polymerizable material into the cavity of said mold (1) and a station (42) for plugging said filling hole (19), said introduction station (41) and said plugging station (42) being disposed side by side, in that a unit (31) is provided for receiving said mold (1) in a predetermined position and said receiving unit (31) is mobile between a first position in which it is vertically aligned with the plugging station (42) and a second position in which it is vertically aligned with the introduction station (41).

23. The method according to claim 22, wherein at least one optical cell (46, 47) is provided for detecting the position of the mold (1) relative to said filling station (41) or said plugging station (42) and in that said unit (31) for receiving the mold is placed in vertical alignment with said filling station (41) or in vertical alignment with said plugging station (42) in conjunction with said optical cell (46, 47).

24. The method according to claim 23, wherein respective optical cells (46, 47) are provided for said filling station (41) and said plugging station (42).

25. An annular seal, comprising:
    means (10, 11) for cooperating with a periphery of two facing first and second molding shells (2, 3) to define a molding cavity, adapted to be compressed elastically by a force for moving the shells toward each other that is applied between the means (10, 11) adapted to cooperate with the periphery of the first shell (2) and the means (10, 11) adapted to cooperate with the periphery of the second shell (3);
    a filling hole (19) away from said means (10, 11) and adapted to cooperate with the periphery of the shells (2, 3), the filling hole comprising a first section (21) and a second section (22), the first section (21) extending between a first end opening into said molding cavity and a second end by which it is joined to a first end of the second section (22),
    the only hole in said seal is said filling hole (19), and
    a plug (5) comprising a body (25) having a first portion adapted to fit tightly into said first section (21) of the filling hole (19) to plug it and a second portion to define with said second section (22) of the filling hole (19) a chamber (26) around said body (25) of the plug, with said first portion of the body (25) having a free end,
    wherein the annular seal is adapted for obtaining an optical lens from a polymerizable material by:
    filling said molding cavity with said polymerizable material by a filling means (41, 42);
    polymerizing the material filling the molding cavity;
    prior to the polymerizing the material filling the molding cavity, applying an external mechanical force to move said shells toward each other by a means (34-40) for applying a force; and
    prior to the polymerizing, releasing said force, the force producing a compression of the seal (4) and the shells (2, 3), wherein
    in that during said filling stage said material is introduced into the cavity through said filling hole (19), and in that said material is introduced after said step of applying the external mechanical force to move said shells (2, 3) toward each other before said step of releasing said force.

26. The seal according to claim 25, wherein a the volume of said chamber (26) around the body (25) of the plug (5) is greater than a volume of said first section (21) of the filling hole (19).

27. The seal according to claim 25, wherein said filling hole (19) further comprises a third section (23) that extends between a first end at which it is joined to the second end of the second section (22) and a second end that opens to the exterior of said seal (4) and in that plug (5) comprises a head (24) adapted to fit tightly into said third section (23) of the filling hole (19) to plug it so that said chamber (26) is then entirely closed.

28. The seal according to claim 25, wherein the seal further comprises a boss (20) around said filling hole (19) and projecting relative to its lateral surface (15).

29. The seal according to claim 25, wherein said filling hole (19) is oriented in a radial direction.

30. The seal according to claim 25, wherein said filling hole (19) is halfway or substantially halfway between said means (10, 11) adapted to cooperate with a first shell (2) and with the second shell (3), respectively.

31. The seal according to claim 25, wherein the seal further comprises a relatively narrow lug (17) projecting relative to the lateral surface (15) of said seal (4) and having a transverse edge surface (18) at a predetermined location relative to the remainder of the seal.

32. The seal according to claim 31, wherein an the angular distance between said filling hole (19) and said relatively narrow lug (17) is such that said lug (17) is visible above said seal (14) when said mold (1) is placed with said filling hole (19) at the top.

33. The seal according to claim 25, wherein said plug (5) for plugging said filling hole (19) comprises a blind hole (51) having its closed end inside said body (25).

34. The seal according to claim 25, wherein the seal further comprises a belt (8) to the inside of which is joined a bead (9) narrower than said belt (8), said bead (9) having a dovetail-shaped cross section whose narrower side is that by which said bead (9) is joined to said belt (8), so that there exists on either side of said bead (9) a recess adapted to receive one of said shells (2, 3).

35. The seal according to claim 25, wherein said plug (5) and said seal (4) are made from the same material.

36. A device for obtaining an optical lens from a polymerizable material, the device comprising:
    a mold (1) formed of two facing and spaced molding shells (2, 3); and
    an annular seal (4) comprising means (10, 11) for cooperating with the periphery of said shells (2, 3) to define a molding cavity, said seal (4) being adapted to be, prior to polymerizing said polymerizable material filling the molding cavity, compressed elastically by a force for moving said shells toward each other to produce a compression of the seal (4) providing a seal between the seal (4) and the shells (2, 3); and
    means (41, 42) for filling said molding cavity with said polymerizable material and means (34-40) for applying a force for moving said shells (2, 3) toward each other, wherein
    said seal (4) comprises a filling hole (19) away from said means (10, 11) for cooperating with a periphery of the shells (2, 3), in that said filling means (41, 42) are adapted to introduce said material into the molding cavity through said filling hole (19), and in that said means (34-40) applying a force for moving said shells toward each other are adapted to apply and release said force respectively before and after the use of said filling means (41, 42), wherein
    the device adapted for obtaining the optical lens from the polymerizable material by:
    filling said molding cavity with said polymerizable material;
    polymerizing the material filling the molding cavity;
    prior to the polymerizing the material filling the molding cavity, applying the force to move said shells toward each other; and
    prior to the polymerizing, releasing said force, the force producing the compression of the seal (4) and the shells (2, 3), wherein in that during said filling stage said material is introduced into the cavity through said filling hole (19), and in that said material is introduced after said step of applying the force to move said shells toward each other before said step of releasing said force, and wherein the filling hole comprises a first section (21) and a second section (22), the first section (21) extending between a first end opening into said molding cavity and a second end by which it is joined to a first end of the second section (22); said seal (4) further comprising a plug (5) having a body (25) with a first portion adapted to fit tightly into said first section (21) of the filling hole (19) to plug the filling hole (19), and the body (25) has a second portion to define with the second section (22) of the filling hole (19) a chamber (26) around said second portion of the body (25), with said first portion of the body (25) having a free end.

37. The device according to claim 36, wherein said means (34-40) for applying a force for moving said shells (2, 3) toward each other comprise means (37, 40) for moving said shells toward each other until a predetermined force is reached.

38. The device according to claim 37, wherein said means for applying a force for moving said shells toward each other comprise an actuator (37) connected to a control center (40).

39. The device according to claim 36, wherein said means for applying a force for moving said shells toward each other comprise, for applying said force to said shell, respective sleeves (34, 35) whose diameter is slightly less than that of said shells (2, 3).

40. The device according to claim 36, wherein the device further comprises a unit (31) for receiving said mold (1) provided with said means (34-40) for applying a force for moving said shells toward each other.

41. The device according to claim 40, wherein said unit (31) for receiving the mold (1) comprises centering means (32) and angular positioning means (33).

42. The device according to claim 41, wherein said centering means comprise two longitudinally oriented fingers (32) adapted to cooperate with the lateral surface (15) of said seal (4) and said angular positioning means comprise a fork (33) adapted to cooperate with a boss (20) projecting relative to the lateral surface (15) of said seal.

43. The device according to claim 36, wherein said filling means comprise a station (41) for introducing said polymerizable material into the cavity of said mold (1) and a station (42) for plugging said filling hole, said introduction station (41) and said plugging station (42) being disposed side by side, in that said device (30) comprises a unit (31) for receiving said mold in a vertical position with said filling hole (19) situated at the top of said seal (4), and in that said unit (31) for receiving the mold (1) is movable between a first position in which it is vertically aligned with the plugging station (42) and a second position in which it is vertically aligned with the introduction station (41).

44. The device according to claim 43, wherein said introduction station (41) comprises a nozzle (48) for introducing said material and a nozzle (49) for aspirating surplus material.

45. The device according to claim 44, wherein said material introduction nozzle (48) is inclined.

46. The device according to claim 44, wherein a the distal end of said introduction nozzle (48) is below a distal end of said aspiration nozzle (49).

47. The device according to claim 44, wherein said plug (5) for plugging said filling hole (19) comprises a blind hole (51) and in that said plugging station (42) comprises a canula (50) adapted to be engaged in said blind hole (51) of said plug (5).

48. The device according to claim 47, wherein the device further comprises means for connecting said canula (50) to a vacuum system to hold said plug in place on said canula and for venting said canula (50) to the atmosphere to release said plug (5).

49. The device according to claim 47, wherein the device further comprises means for driving said plugging station (42) to push said plug (5) into said filling hole (19).

\* \* \* \* \*